US012767513B2

(12) United States Patent
Naik et al.

(10) Patent No.: US 12,767,513 B2
(45) Date of Patent: Oct. 20, 2026

(54) SYSTEMS AND METHODS FOR INCREMENTALLY FILLING LIQUID STORAGE RECEPTACLES

(71) Applicant: Midea Group Co., Ltd., Foshan (CN)

(72) Inventors: Vinayak Naik, Barbourmeade, KY (US); Eric L. Scalf, Louisville, KY (US)

(73) Assignee: Midea Group Co., Ltd., Foshan (CN)

( * ) Notice: Subject to any disclaimer, the term of this patent is extended or adjusted under 35 U.S.C. 154(b) by 104 days.

(21) Appl. No.: 18/788,539

(22) Filed: Jul. 30, 2024

(65) Prior Publication Data

US 2026/0035228 A1 Feb. 5, 2026

(51) Int. Cl.
*B67D 1/00* (2006.01)
*B67D 1/08* (2006.01)

(52) U.S. Cl.
CPC ......... *B67D 1/0009* (2013.01); *B67D 1/0884* (2013.01); *B67D 2210/00104* (2013.01); *B67D 2210/00154* (2013.01)

(58) Field of Classification Search
CPC ................ B67D 1/0009; B67D 1/0884; B67D 2210/00104; B67D 2210/00154
See application file for complete search history.

(56) References Cited

U.S. PATENT DOCUMENTS

| | | | | |
|---|---|---|---|---|
| 7,823,411 B2 * | 11/2010 | Gagliano | B67D 1/1438 | 62/390 |
| 7,878,372 B1 * | 2/2011 | Camejo | B67D 3/0077 | 222/146.6 |
| 8,496,136 B2 * | 7/2013 | Jones | B01F 35/714 | 222/64 |
| 8,985,473 B2 | 3/2015 | Liu | | |
| 9,493,333 B2 | 11/2016 | Cornelis et al. | | |
| 11,332,357 B2 | 5/2022 | Yamashita et al. | | |
| 11,498,825 B2 * | 11/2022 | Yamashita | F25D 11/00 | |
| 2005/0284882 A1 * | 12/2005 | Belongia | B67D 7/08 | 222/64 |
| 2014/0319172 A1 * | 10/2014 | Tremel | B41J 2/17596 | 222/64 |
| 2021/0009401 A1 * | 1/2021 | Yamashita | B67D 1/0884 | |
| 2021/0038017 A1 | 2/2021 | Gnadinger et al. | | |

FOREIGN PATENT DOCUMENTS

| | | |
|---|---|---|
| CN | 214406501 U | 10/2021 |
| CN | 219160691 U | 6/2023 |

* cited by examiner

*Primary Examiner* — Frederick C Nicolas
(74) *Attorney, Agent, or Firm* — Dinsmore & Shohl LLP

(57) ABSTRACT

A method for incrementally filling a water receptacle may include the steps of determining a fill-level of the liquid within the liquid storage receptacle and incrementally filling the liquid storage receptacle in response, wherein: if the fill-level of the of the liquid within the liquid storage receptacle is below the first predetermined threshold, filling the liquid storage receptacle until the volume of liquid is equal to a first predetermined threshold, then cooling the liquid within the liquid storage receptacle until the liquid reaches a predetermined temperature, then, if the fill-level of the liquid within the liquid storage receptacle is equal to or above the first predetermined threshold but below the second predetermined threshold, filling the liquid storage receptacle until the volume of liquid is equal to the second predetermined threshold, and then cooling the liquid within the liquid storage receptacle until the liquid reaches the predetermined temperature.

20 Claims, 3 Drawing Sheets

SYSTEMS AND METHODS FOR INCREMENTALLY FILLING LIQUID STORAGE RECEPTACLES

BACKGROUND

The present embodiments relate to systems and methods for incrementally filling liquid storage receptacles, with particular embodiments shown for incrementally filling liquid storage receptacles placed associated with refrigerators.

Typical liquid storage receptacles may be disposed inside of refrigerators so that the liquid stored inside can be cooled prior to distributing to a user. When liquid is removed from the liquid storage receptacle, such as when a user fills a cup or pitcher, the liquid storage receptacle needs to be re-filled. Typically, liquid storage receptacles are filled from liquid sources that house ambient temperature liquid, such as municipal water supplies. Therefore, filling the liquid storage receptacle completely full may undesirably allow warmer water to be stored and potentially distributed to the user. Thus, there is a need for systems and methods that incrementally fill the liquid storage receptacles so that a volume of cooled liquid can be present for distribution.

SUMMARY

The herein-described embodiments address these and other problems associated with the art by providing systems for filling liquid storage receptacles. In various embodiments, the system may incrementally fill the liquid storage receptacle to allow the liquid within the liquid storage receptacle to be cooled before filling an additional portion of the liquid storage receptacle. In some embodiments, the system may fill the liquid storage receptacle to various predetermined thresholds, which may be virtual fill levels of the liquid storage receptacle, and allowing the liquid to cool prior to filling the liquid storage receptacle to another predetermined threshold. In further embodiments, the system may incrementally fill the liquid storage receptacle by filling the liquid storage receptacle for predetermined time intervals, and allowing the liquid to cool prior to filling the liquid storage receptacle for another predetermined amount of time.

In addition, in some embodiments a method for incrementally filling a water receptacle may include the steps of determining that at least a portion of a volume of liquid has been removed from a liquid storage receptacle, determining a fill-level of the liquid within the liquid storage receptacle and incrementally filling the liquid storage receptacle in response, wherein: if the fill-level of the of the liquid within the liquid storage receptacle is below the first predetermined threshold, filling the liquid storage receptacle until the volume of liquid is equal to a first predetermined threshold, then cooling the liquid within the liquid storage receptacle until the liquid reaches a predetermined temperature, then, if the fill-level of the liquid within the liquid storage receptacle is equal to or above the first predetermined threshold but below the second predetermined threshold, filling the liquid storage receptacle until the volume of liquid is equal to the second predetermined threshold, and then cooling the liquid within the liquid storage receptacle until the liquid reaches the predetermined temperature.

In addition, in some embodiments a method for incrementally filling a liquid storage receptacle may include determining that at least a portion of a volume of liquid has been removed from the liquid storage receptacle, determining the amount of liquid that has been removed from the liquid storage receptacle with a flow sensor, incrementally filling the liquid storage receptacle in response, wherein: filling the liquid storage receptacle for a first predetermined amount of time, wherein the first determined amount of time is calculated based on half of the amount of liquid that has been removed from the liquid storage receptacle, then cooling the liquid within the liquid storage receptacle until the liquid reaches a predetermined temperature, and then filling the liquid storage receptacle for a second predetermined amount of time, wherein the second determined amount of time is calculated based on a remaining amount of liquid that has been removed from the liquid storage receptacle, and then cooling the liquid within the liquid storage receptacle until the liquid reaches a predetermined temperature.

In addition, in some embodiments a system for incrementally filling a liquid storage receptacle may include a valve fluidly coupled to an inlet of the liquid storage receptacle; a temperature sensor embedded within the liquid storage receptacle; a controller communicatively coupled to the valve and the temperature sensor, the controller comprising a processor and a non-transitory, processor-readable storage medium storing program modules that, when executed by the processor, cause the controller to: determine that at least a portion of a volume of liquid has been removed from a liquid storage receptacle; determine a fill-level of the liquid within the liquid storage receptacle and incrementally filling the liquid storage receptacle in response, wherein: if the fill-level of the of the liquid within the liquid storage receptacle is below the first predetermined threshold, fill the liquid storage receptacle until the volume of liquid is equal to a first predetermined threshold; then cool the liquid within the liquid storage receptacle until the liquid reaches a predetermined temperature; then, if the fill-level of the liquid within the liquid storage receptacle is equal to or above the first predetermined threshold but below the second predetermined threshold, fill the liquid storage receptacle until the volume of liquid is equal to the second predetermined threshold; and then cool the liquid within the liquid storage receptacle until the liquid reaches the predetermined temperature.

These and other advantages and features are set forth in the claims annexed hereto and forming a further part hereof. However, for a better understanding of the invention, and of the advantages and objectives attained through its use, reference should be made to the figures, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used in any way to the scope of the claimed subject matter.

DETAILED DESCRIPTION

Figure 1:
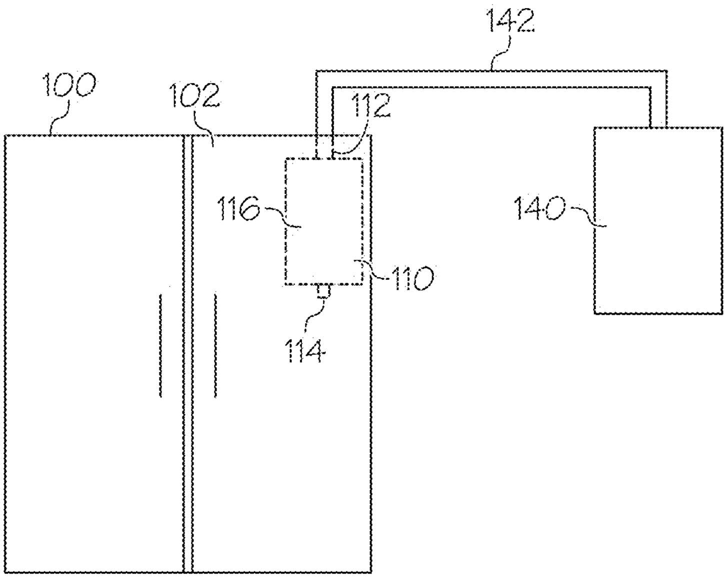
FIG. 1 is a view of a liquid storage receptacle disposed within a refrigerator, consistent with some embodiments of the dishwasher securing systems.

Turning now to the drawings, wherein like numbers denote like parts throughout the several views, FIG. 1 illustrates a refrigerator 100. The refrigerator may include an interior cavity 102. A liquid storage receptacle 110 may be disposed within the refrigerator 100. In the illustrated embodiment, the liquid storage receptacle 110 is disposed within the interior cavity 102 of the refrigerator 100, but it should be understood that, in embodiments, the liquid storage receptacle 110 may be disposed in any suitable location within or about a refrigerator 100, including but not limited to within or associated with a door, exterior to the door, accessible without opening the door, immediately external to the appliance, within or associated with a drawer, or any other suitable location within and/or adjacent to the refrigerator 100, such as being accessible through a door or flap.

In further embodiments, it should be understood that the liquid storage receptacle 110 may be arranged in any other suitable environment, such as a water cooler, a water bottle filler, or any other suitable environment.

The liquid storage receptacle 110 may be fluidly connected to a liquid source 140 with a fluid pipe 142. The liquid source 140 may be any suitable liquid source, including but not limited to a municipal water supply, a well, another internal tank, including a tank located within refrigerator, a heat exchanger, or any other suitable liquid source.

The liquid storage receptacle 110 may have an inlet 112 and an outlet 114. The fluid pipe 142 may be fluidly coupled to the inlet 112. The outlet 114 may be shaped and sized to dispense liquid. While the inlet 112 and the outlet 114 are shown on opposite ends of the liquid storage receptacle 110 in the figures, it should be understood that, in embodiments, the inlet 112 and the outlet 114 may be located on the same end of the liquid storage receptacle 110.

The liquid storage receptacle 110 may define an interior cavity 116. The interior cavity 116 may be shaped and sized to store liquid therein.

In some embodiments, the outlet 114 may be configured in the door of the refrigerator 100 such that a user may dispense liquid from the liquid storage receptacle 110 without opening the door of the refrigerator 100. In further embodiments, the outlet 114 may be confined within the interior cavity 116 of the refrigerator 100.

Figure 2:
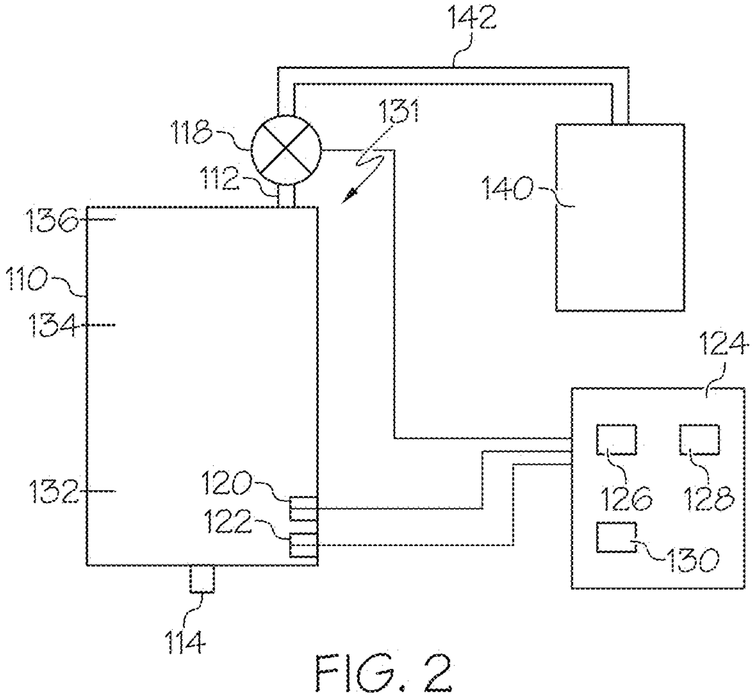
FIG. 2 is a view of a liquid storage receptacle, consistent with some embodiments of the dishwasher securing system.

Referring now to FIG. 2, a view of a system for incrementally filling the liquid storage receptacle 110 is shown. The liquid storage receptacle 110 may include a valve 118 fluidly coupled to the inlet 112. The valve 118 may regulate the flow from the liquid source 140 into the liquid storage receptacle 110. The valve 118 may be any suitable type of valve, including but not limited to a ball valve, a globe valve, a butterfly valve, a gate valve, or any other suitable type of valve. In some embodiments, the valve 118 may have an electric actuator that is capable of opening and/or closing the valve 118, such as a stepper motor, a servo motor, or any other suitable type of motor configured to open and close the valve 118. In other embodiments, the valve 118 may have a handle for manually opening and/or closing the valve 118.

In embodiments where the liquid source 140 (FIG. 1) is a tank located within refrigerator, the valve 118 may be placed at an inlet to the liquid source 140 in place of or in addition to the valve 118 coupled to the inlet 112 of the liquid storage receptacle 110.

A temperature sensor 120 may be disposed within the interior cavity 116. The temperature sensor 120 may be configured to detect a temperature of the liquid held within the liquid storage receptacle 110. The temperature sensor 120 may be any suitable type of temperature sensor, including but not limited to a thermistor, a thermocouple, a resistive temperature detector, a semiconductor based sensor, or any other suitable type of temperature sensor.

A fill sensor 122 may be disposed within the interior cavity 116. The fill sensor 122 may determine a fill state of the liquid storage receptacle 110. The fill sensor 122 may be any suitable type of fill sensor, including but not limited to an optical level sensor, a pressure sensor, a float sensor, a radar sensor, or any other suitable type of fill sensor.

The valve 118, the temperature sensor 120, and the fill sensor 122 are communicatively coupled to a controller 124. The controller 124 may include a processor 128 and a non-transitory, processor-readable storage medium 126 (herein referred to as "memory") for storing program modules that, when executed by the processor 128, perform one or more processes described herein. The memory 126 may be one or more memory devices that store data as well as software and may also comprise, for example, one or more of RAM, ROM, magnetic storage, or optical storage.

The controller 124 may then communicate a signal to the valve 118 to close the valve 118. However, it should be understood that other suitable electromechanical devices may be communicatively coupled to the controller 124 and used to open and close the valve 118, such as a pneumatic or hydraulic ram, or any other suitable device.

A user interface 130 may be communicatively coupled to the controller 124. The user interface 130 may be configured to allow a user to enter commands into the controller 124. The user interface 130 may be any suitable type of user interface, such as a keyboard, a touchpad, a set of switches and/or buttons, or any other suitable user interface. While the user interface 130 is shown as being physically connected to the controller 124, it should be understood that in embodiments, the user interface 130 may be wirelessly communicatively coupled to the controller 124, such as being integrated into a user's mobile device and being communicatively coupled to the controller via a network such as Wi-Fi, Bluetooth, cellular, or any other suitable type of network.

The liquid storage receptacle 110 has a plurality of predetermined thresholds 131 corresponding to a fill level of the liquid storage receptacle 110. As illustrated, the liquid storage receptacle 110 has a first predetermined threshold 132, a second predetermined threshold 134, and a third predetermined threshold 136, although it should be understood that, in embodiments, any suitable number of predetermined thresholds 131 may be included including but not limited to two predetermined thresholds 131, four predetermined thresholds 131, five predetermined thresholds 131, or any other suitable number of predetermined thresholds 131.

As illustrated, the first predetermined threshold 132 corresponds to the liquid storage receptacle 110 being twenty-percent filled, the second predetermined threshold 134 corresponds to the liquid storage receptacle 110 being seventy-percent filled, and the third predetermined threshold 136 corresponds to the liquid storage receptacle 110 being fully filled. However, it should be understood that, in embodiments, each of the plurality of predetermined thresholds 131 may correspond to any suitable fill level of the liquid storage receptacle 110. For example, instead of percentages of fill, the various thresholds can be specific volume targets. As one example, the first predetermined threshold 132 can be a specific volume, such as 4 ounces; the second predetermined threshold 134 can be a specific volume, such as 8 ounces; and the third predetermined threshold 136 can be a specific volume, such as 12 ounces. Obviously, these volumes can be any desired volume, and the intervals between the thresholds can be any desired interval. All of such volumes can be determined, and in some instances, input, via a user, such as via user interface 130.

Each of the predetermined thresholds 131 may be virtual thresholds. In some embodiments, each of the predetermined thresholds 131 may include a physical marking, such as a line or hatch mark.

Figure 3:
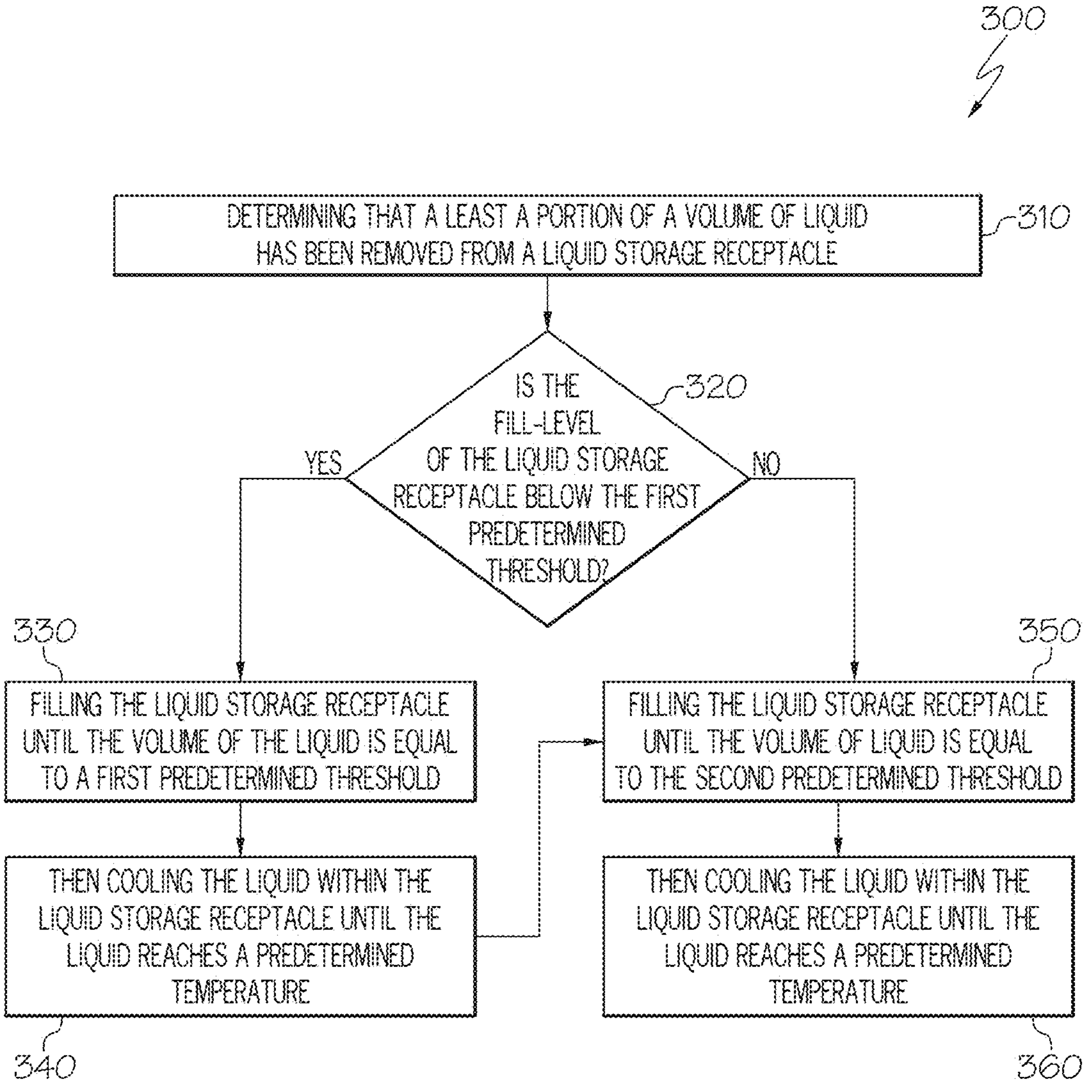
FIG. 3 is a flowchart of a method for incrementally filling a liquid storage receptacle, consistent with some embodiments of the dishwasher securing system.

Referring now to FIG. 3, a method 300 for incrementally filling the liquid storage receptacle is shown. Referring to block 310, the method 300 includes determining that at least a portion of the volume of liquid has been removed from the liquid storage receptacle 110. That is, the fill sensor 122 may determine that the liquid storage receptacle 110 is less than fully filled, such as when a user dispenses at least a portion of the liquid out of the outlet 114. In some embodiments, this may be the user filling a cup or pitcher with liquid from the liquid storage receptacle 110.

Referring to block 320, the method 300 includes determining if the fill-level of the liquid remaining in the liquid storage receptacle 110 is below the first predetermined threshold 132. That is, the fill sensor 122 may determine the fill-level of the liquid remaining in the liquid storage receptacle 110 after a portion of the liquid has been removed from the liquid storage receptacle. If the fill-level in the liquid storage receptacle 110 is below the first predetermined threshold (block 320=YES), the method 300 proceeds to block 330. If the fill-level in the liquid storage receptacle 110 is equal to or above the first predetermined threshold (block 320=NO), the method 300 proceeds to block 350.

Referring to block 330, the method 300 includes filling the liquid storage receptacle 110 until the volume of liquid is equal to the first predetermined threshold 132. That is, the controller 124 transmits a signal to the valve 118 to open and allow liquid to flow into the liquid storage receptacle 110 until the fill level of the liquid is equal to the first predetermined threshold 132.

In some embodiments, the first predetermined threshold 132 is twenty-percent filled. The first predetermined threshold 132 may be preset and stored in the memory 126. However, it should be understood that any other predetermined threshold may be used, including but not limited to five-percent filled, ten-percent filled, twenty-five-percent filled, thirty-percent filled, fifty-percent filled, or any other fill level.

In further embodiments, the first predetermined threshold 132 may be configured by an operator through the user interface 130. That is, a user may enter a custom first predetermined threshold 132 in the user interface 130.

Referring to block 340, the method 300 includes cooling the liquid within the liquid storage receptacle until the liquid reaches a predetermined temperature. That is, the temperature sensor 120 determines a temperature of the liquid within the liquid storage receptacle 110. If the temperature of the liquid within the liquid storage receptacle 110 is equal to or below a predetermined temperature, the method may proceed to block 350. If the temperature of the liquid within the liquid storage receptacle 110 is above the predetermined temperature, the refrigeration system of the refrigerator 100 cools the liquid within the liquid storage receptacle until the liquid is equal to or below the predetermined temperature.

In some embodiments, the predetermined temperature is forty-five degrees Fahrenheit. The predetermined temperature may be preset and stored in the memory 126. However, it should be understood that any other predetermined temperature may be used, including but not limited to thirty-three degrees Fahrenheit, thirty-four degrees Fahrenheit, thirty-eight degrees Fahrenheit, forty degrees Fahrenheit, fifty degrees Fahrenheit, or any other suitable temperature above approximately thirty-three degrees Fahrenheit, depending on application and user preference.

In further embodiments, the predetermined temperature may be input by the user, such as via user interface 130. In even further embodiments, such as during heavy usage times such as during meal times, the predetermined temperature may be automatically increased.

Referring to block 350, the method 300 includes filling the liquid storage receptacle until the volume of liquid is equal to the second predetermined threshold 134. That is, the controller 124 transmits a signal to the valve 118 to open and allow liquid to flow into the liquid storage receptacle 110 until the fill level of the liquid is equal to the second predetermined threshold 134.

In some embodiments, the second predetermined threshold 134 is seventy-percent filled. The second predetermined threshold 134 may be preset and stored in the memory 126. However, it should be understood that any other predetermined threshold may be used, including but not limited to fifty-five-percent filled, sixty-percent filled, sixty-five-five-percent filled, seventy-five-percent filled, eighty-percent filled, or any other fill level.

In further embodiments, the second predetermined threshold 134 may be configured by an operator through the user interface 130. That is, a user may enter a custom second predetermined threshold 134 in the user interface 130.

Referring to block 360, the method 300 includes cooling the liquid within the liquid storage receptacle until the liquid reaches a predetermined temperature. That is, the temperature sensor 120 determines a temperature of the liquid within the liquid storage receptacle 110. If the temperature of the liquid within the liquid storage receptacle 110 is above the predetermined temperature, the refrigeration system of the refrigerator 100 cools the liquid within the liquid storage receptacle until the liquid is equal to or below the predetermined temperature. The predetermined temperature may be the same predetermined temperature as described above in relation to block 340.

It should be understood that the steps of blocks 350 and 360 may be repeated for any suitable number of predetermined thresholds 131. As a non-limiting example, the steps of blocks 350 and 360 may be repeated for a third predetermined threshold 136. In some embodiments, the third predetermined threshold may be equal to the liquid storage receptacle 110 being fully-filled. In embodiments where a third predetermined threshold 136 is used, it should be understood that the decision step at block 320 may further determine if the fill-level of the liquid storage receptacle is equal to or above the second predetermined threshold 134 but below the third predetermined threshold 136, proceeding directly to filling the liquid storage receptacle 110 until the volume of liquid is equal to the third predetermined threshold.

Figure 4:
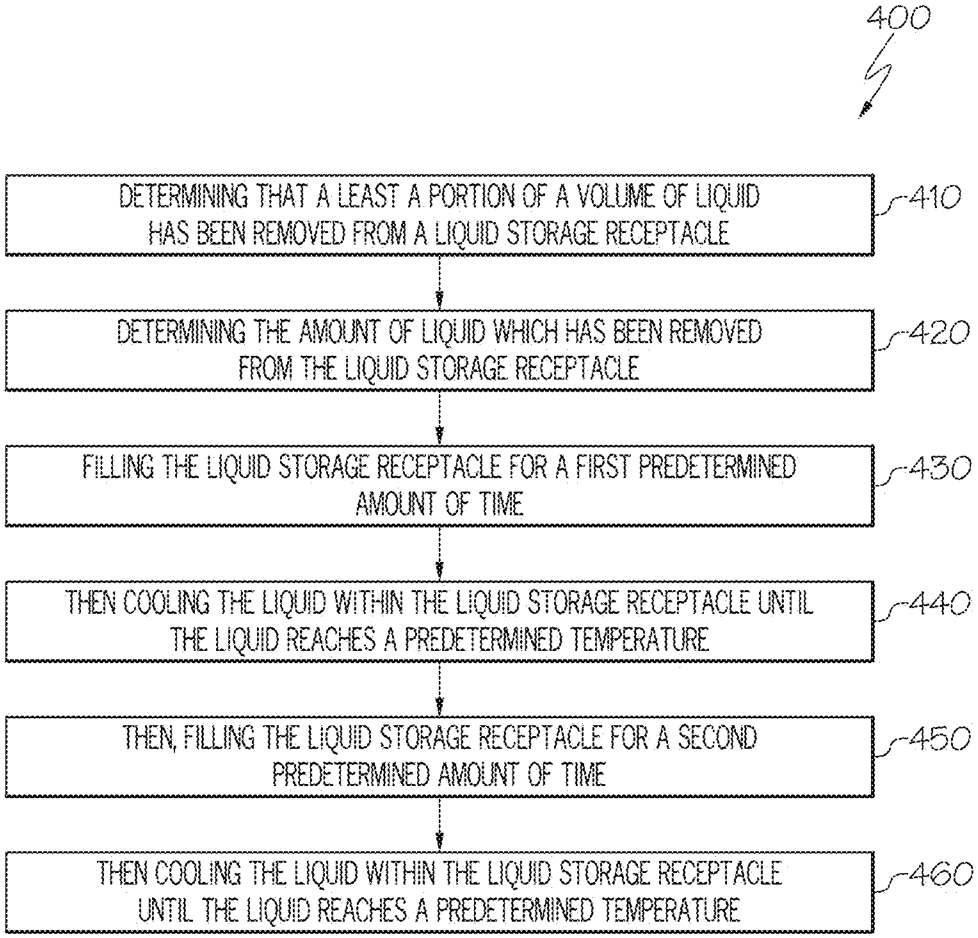
FIG. 4 is a flowchart of a method for incrementally filling a liquid storage receptacle, consistent with some embodiments of the dishwasher securing system.

Referring now to FIG. 4, a method 400 for incrementally filling the liquid storage receptacle is shown. Referring to block 410, the method 400 includes determining that at least a portion of the volume of liquid has been removed from the liquid storage receptacle 110. That is, the fill sensor 122 may determine that the liquid storage receptacle 110 is less than fully filled, such as when a user dispenses at least a portion of the liquid out of the outlet 114. In some embodiments, this may be the user filling a cup or pitcher with liquid from the liquid storage receptacle 110.

Referring to block 420, the method 400 includes determining the amount of liquid that has been removed from the liquid storage receptacle 110. That is, the fill sensor 122 may determine the amount of liquid that has been removed from the liquid storage receptacle 110. In some embodiments, the controller 124 may compare the fill level from before the dispensing event described in relation to block 410 to the fill level after the dispensing event described in relation to block 410.

In further embodiments, the fill level may be determined by flow metering the liquid entering the liquid storage receptacle 110. In even further embodiments, the fill level may be estimated based on the fill time and the known flow rates.

Referring to block 430, the method 400 includes filling the liquid storage receptacle 110 for a first predetermined amount of time. That is, the controller 124 may transmit a signal to the valve 118 to open for the first predetermined amount of time, such that the liquid storage receptacle is filled for the first predetermined amount of time.

In embodiments, the first predetermined amount of time may be one second, three seconds, five seconds, ten seconds, thirty seconds, or any other predetermined amount of time. The first predetermined amount of time may be preset and saved to the memory 126. In other embodiments, the user may manually enter the first predetermined amount of time via the user interface 130. In further embodiments, the controller 124 may calculate the first predetermined amount of time in response to the determined amount of liquid that has been removed from the liquid storage receptacle 110.

Referring to block 440, the method 400 includes cooling the liquid within the liquid storage receptacle 110 until the liquid reaches a predetermined temperature. That is, the temperature sensor 120 determines a temperature of the liquid within the liquid storage receptacle 110. If the temperature of the liquid within the liquid storage receptacle 110 is equal to or below the predetermined temperature, the method may proceed to block 450. If the temperature of the liquid within the liquid storage receptacle 110 is above the predetermined temperature, the refrigeration system of the refrigerator 100 cools the liquid within the liquid storage receptacle until the liquid is equal to or below the predetermined temperature.

In some embodiments, the predetermined temperature is forty-five degrees Fahrenheit. The predetermined temperature may be preset and stored in the memory 126. However, it should be understood that any other predetermined temperature may be used, including but not limited to thirty-three degrees Fahrenheit, thirty-four degrees Fahrenheit, thirty-eight degrees Fahrenheit, forty degrees Fahrenheit, fifty degrees Fahrenheit, or any other suitable temperature. In further embodiments, the user may customize the predetermined temperature via the user interface 130.

Referring to block 450, the method 400 includes filling the liquid storage receptacle 110 for a second predetermined amount of time. That is, the controller 124 may transmit a signal to the valve 118 to open for the second predetermined amount of time, such that the liquid storage receptacle is filled for the second predetermined amount of time.

In embodiments, the second predetermined amount of time may be one second, three seconds, five seconds, ten seconds, thirty seconds, or any other predetermined amount of time. The second predetermined amount of time may be preset and saved to the memory 126. In other embodiments, the user may manually enter the second predetermined amount of time via the user interface 130. In further embodiments, the controller 124 may calculate the second predetermined amount of time in response to the determined amount of liquid that has been removed from the liquid storage receptacle 110.

In some embodiments, the first predetermined amount of time and the second predetermined amount of time may be equal to one another. In other embodiments, the first predetermined amount of time and the second predetermined amount of time may be different than one another.

Referring to block 460, the method 400 includes cooling the liquid within the liquid storage receptacle 110 until the liquid reaches a predetermined temperature. That is, temperature sensor 120 determines a temperature of the liquid within the liquid storage receptacle 110. If the temperature of the liquid within the liquid storage receptacle 110 is equal to or below the predetermined temperature, the method may proceed to block 450. If the temperature of the liquid within the liquid storage receptacle 110 is above the predetermined temperature, the refrigeration system of the refrigerator 100 cools the liquid within the liquid storage receptacle until the liquid is equal to or below the predetermined temperature.

In some embodiments, the predetermined temperature is forty-five degrees Fahrenheit. The predetermined temperature may be preset and stored in the memory 126. However, it should be understood that any other predetermined temperature may be used, including but not limited to thirty-three degrees Fahrenheit, thirty-four degrees Fahrenheit, thirty-eight degrees Fahrenheit, forty degrees Fahrenheit, fifty degrees Fahrenheit, or any other suitable temperature above thirty-three degrees Fahrenheit, depending on application and user preference. In further embodiments, the user may customize the predetermined temperature via the user interface 130.

In some embodiments, the liquid storage receptacle 110 may be fully filled after the liquid storage receptacle is filled for the second predetermined amount of time. However, it should be understood that in further embodiments, the steps of blocks 450 and 460 may be repeated for any suitable number of predetermined times until fully filled.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A method for incrementally filling a water receptacle, the method comprising the steps of:

determining that at least a portion of a volume of liquid has been removed from a liquid storage receptacle;

determining a fill-level of the liquid within the liquid storage receptacle and incrementally filling the liquid storage receptacle in response, wherein:

if the fill-level of the liquid within the liquid storage receptacle is below a first predetermined threshold, filling the liquid storage receptacle until the volume of liquid is equal to the first predetermined threshold;

then cooling the liquid within the liquid storage receptacle until the liquid reaches a predetermined temperature;

then, if the fill-level of the liquid within the liquid storage receptacle is equal to or above the first predetermined threshold but below a second predetermined threshold, filling the liquid storage receptacle until the volume of liquid is equal to the second predetermined threshold; and then cooling the liquid within the liquid storage receptacle until the liquid reaches the predetermined temperature.

2. The method of claim 1, wherein the second predetermined threshold is a fully filled liquid storage receptacle.

3. The method of claim 1, further comprising the step of, if the fill-level of the liquid within the liquid storage receptacle is equal to or above the second predetermined threshold but less than a third predetermined threshold, filling the liquid storage receptacle until the volume of liquid fully fills the liquid storage receptacle; and then cooling the liquid within the liquid storage receptacle until the liquid reaches the predetermined temperature.

4. The method of claim 3, wherein the third predetermined threshold is a fully filled liquid storage receptacle.

5. The method of claim 3, where the first predetermined threshold is twenty-percent filled and the second predetermined threshold is seventy-percent filled.

6. The method of claim 1, where the predetermined temperature is input by a user via a user interface.

7. The method of claim 1, wherein the liquid storage receptacle is fluidly coupled to a valve, and where the valve opens and closes to perform the steps of:

(1) filling the liquid storage receptacle until the volume of liquid is equal to the first predetermined threshold; and (2) filling the liquid storage receptacle until the volume of liquid is equal to the second predetermined threshold.

8. The method of step 1, further comprising determining if the liquid within the liquid storage receptacle until the liquid reaches the predetermined temperature is performed by a thermistor, wherein the thermistor is embedded within the liquid storage receptacle.

9. A method for incrementally filling a liquid storage receptacle, the method comprising:

determining that at least a portion of a volume of liquid has been removed from the liquid storage receptacle;

determining an amount of liquid that has been removed from the liquid storage receptacle with a flow sensor;

incrementally filling the liquid storage receptacle in response, wherein:

filling the liquid storage receptacle for a first predetermined amount of time, wherein the first predetermined amount of time is calculated based on half of the amount of liquid that has been removed from the liquid storage receptacle;

then cooling the liquid within the liquid storage receptacle until the liquid reaches a predetermined temperature;

then filling the liquid storage receptacle for a second predetermined amount of time, wherein the second predetermined amount of time is calculated based on a remaining amount of liquid that has been removed from the liquid storage receptacle; and then cooling the liquid within the liquid storage receptacle until the liquid reaches the predetermined temperature.

10. The method of claim 9, wherein the liquid storage receptacle is fully filled after filling the liquid storage receptacle for the second predetermined amount of time.

11. The method of claim 9, further comprising the step of filling the liquid storage receptacle for a third predetermined amount of time, wherein the third predetermined amount of time is calculated based on a remaining amount of liquid that has been removed from the liquid storage receptacle; and then cooling the liquid within the liquid storage receptacle until the liquid reaches the predetermined temperature.

12. The method of claim 11, wherein the liquid storage receptacle is fully filled after filling the liquid storage receptacle for the third predetermined amount of time.

13. The method of claim 9, where the predetermined temperature is input by a user by a user interface.

14. The method of claim 9, wherein the liquid storage receptacle is fluidly coupled to a valve, and where the valve opens and closes to perform the steps of:

(1) filling the liquid storage receptacle for the first predetermined amount of time; and (2) filling the liquid storage receptacle for the second predetermined amount of time.

15. The method of claim 9, further comprising determining if the liquid within the liquid storage receptacle until the liquid reaches the predetermined temperature is performed by a thermistor, wherein the thermistor is embedded within the liquid storage receptacle.

16. A system for incrementally filling a liquid storage receptacle, the system comprising:

a valve fluidly coupled to an inlet of the liquid storage receptacle;

a temperature sensor embedded within the liquid storage receptacle;

a controller communicatively coupled to the valve and the temperature sensor, the controller comprising a processor and a non-transitory, processor-readable storage medium storing program modules that, when executed by the processor, cause the controller to:

determine that at least a portion of a volume of liquid has been removed from the liquid storage receptacle;

determine a fill-level of the liquid within the liquid storage receptacle and incrementally filling the liquid storage receptacle in response, wherein:

if the fill-level of the of the liquid within the liquid storage receptacle is below a first predetermined threshold, fill the liquid storage receptacle until the volume of liquid is equal to the first predetermined threshold;

then cool the liquid within the liquid storage receptacle until the liquid reaches a predetermined temperature;

then, if the fill-level of the liquid within the liquid storage receptacle is equal to or above the first predetermined threshold but below a second predetermined threshold, fill the liquid storage receptacle until the volume of liquid is equal to the second predetermined threshold; and then cool the liquid within the liquid storage receptacle until the liquid reaches the predetermined temperature.

17. The system of claim 16, wherein the system is disposed inside of a refrigerator.

18. The system of claim 16, wherein the second predetermined threshold is a fully filled liquid storage receptacle.

19. The system of claim 16, further comprising a third predetermined threshold, where the non-transitory, processor-readable storage medium, when executed by the processor, causes the controller to:

if the fill-level of the liquid within the liquid storage receptacle is equal to or above the second predetermined threshold but below the third predetermined threshold, fill the liquid storage receptacle until the volume of liquid is equal to the third predetermined threshold; and then cool the liquid within the liquid storage receptacle until the liquid reaches the predetermined temperature.

20. The system of claim 16, wherein the temperature sensor comprises a thermistor.

* * * * *